United States Patent [19]

Hamane et al.

[11] Patent Number: 4,577,720
[45] Date of Patent: Mar. 25, 1986

[54] MOTORCYCLE ENGINE COOLING SYSTEM

[75] Inventors: Masumi Hamane; Masahiko Kimoto, both of Saitama, Japan

[73] Assignee: Honda Giken Kogyo Kabushiki Kaisha, Tokyo, Japan

[21] Appl. No.: 531,217

[22] Filed: Sep. 9, 1983

[30] Foreign Application Priority Data

Sep. 11, 1982 [JP] Japan .................. 57-138082

[51] Int. Cl.⁴ .................. B60K 11/04; B62M 7/06
[52] U.S. Cl. .................. 180/229; 180/68.1
[58] Field of Search .............. 180/229, 219, 225, 226, 180/228, 230, 68.1; 165/41, 44, 51, 53, 54

[56] References Cited

U.S. PATENT DOCUMENTS

| 2,792,899 | 5/1957 | Piatti | 180/229 |
| 3,194,335 | 7/1965 | Lu | 180/229 |
| 4,011,921 | 3/1977 | Sakamoto et al. | 180/229 |

FOREIGN PATENT DOCUMENTS

| 956384 | 12/1956 | Fed. Rep. of Germany | 180/226 |
| 55-78122 | 6/1980 | Japan | 180/229 |
| 55-78123 | 6/1980 | Japan | 180/229 |

Primary Examiner—John A. Pekar
Attorney, Agent, or Firm—Lyon & Lyon

[57] ABSTRACT

Motorcycles having front leg shields, step floors and rear bodies. The rear bodies contain engines and water cooling systems therefor. The radiators of such systems are located above or behind the engine with inlet air directed to the radiator and independently to the engine of these motorcycles.

9 Claims, 5 Drawing Figures

MOTORCYCLE ENGINE COOLING SYSTEM

BACKGROUND OF THE INVENTION

The field of the present invention is water cooling systems for motorcycles and particularly of the type employing a rear mounted engine in a rear body.

Motorcycles in general and particularly smaller motorcycles of the motor scooter type have typically employed air-cooled engines because of the premium on weight and compactness of the vehicle. However, improved combustion and more uniform cooling is available through the use of water-cooled engine cooling systems.

In employing water cooling systems, attention must be directed to the creation of heat by the radiator. Thus, it is advantageous for high efficiency cooling to avoid having the heated exhaust air from the radiator passed directly to the engine. By the same token, separate ducting and remote locations of the radiator to avoid radiator exhaust heating of the engine detract from the compactness of the design so necessary in small motorcycles for low profile, low weight and aesthetic appearance.

SUMMARY OF THE INVENTION

The present invention pertains to a water cooling arrangement for a motorcycle of the type having a rear body within which is mounted a water-cooled engine. The radiator of such a cooling system is mounted above or behind the engine to eliminate the passage of the exhaust heat from the radiator over the engine. Through the use of inlet openings in the rear body, substantial air flow may pass to the radiator in such configurations without first passing over the engine and vice versa. Consequently, efficient cooling can be accomplished without substantial increases in weight and overall size of the vehicle.

With the placement of the radiator above the engine, the radiator may be disposed either substantially horizontally or vertically depending on the intended height of the vehicle seat. Baffles may be employed to insure proper direction of the incoming air to the radiator. Additional inlet openings may be employed to more directly provide air to the engine itself. With the radiator located rearwardly of the engine, the radiator may be positioned directly in front of that opening through the rear body of the motorcycle such that the natural low pressure area at the rear of the vehicle when moving forward may be capitalized upon. Again, baffling and appropriately located inlet openings may be employed to direct air independently to the radiator in that rear position and to the engine.

Accordingly, it is an object of the present invention to provide a water cooling system for a rear mounted engine in a motorcycle of high efficiency and compact design. Other and further objects and advantages will appear hereinafter.

DETAILED DESCRIPTION OF THE PREFERRED EMBODIMENTS

Figure 1:
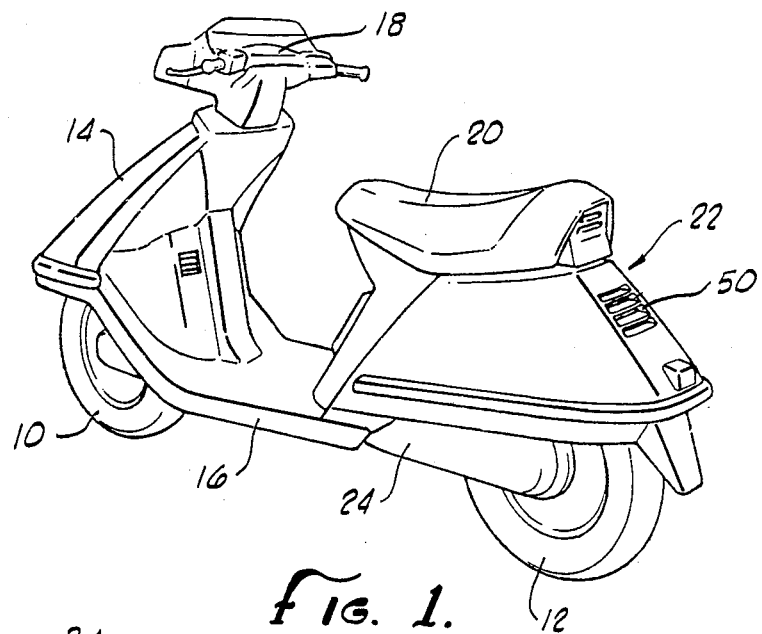
FIG. 1 is an oblique view of a motorcycle of the type employing the present invention.
Figure 3:
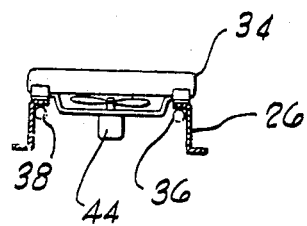
FIG. 3 is a cross-sectional elevation taken along line 3—3 of FIG. 2.
Figure 2:
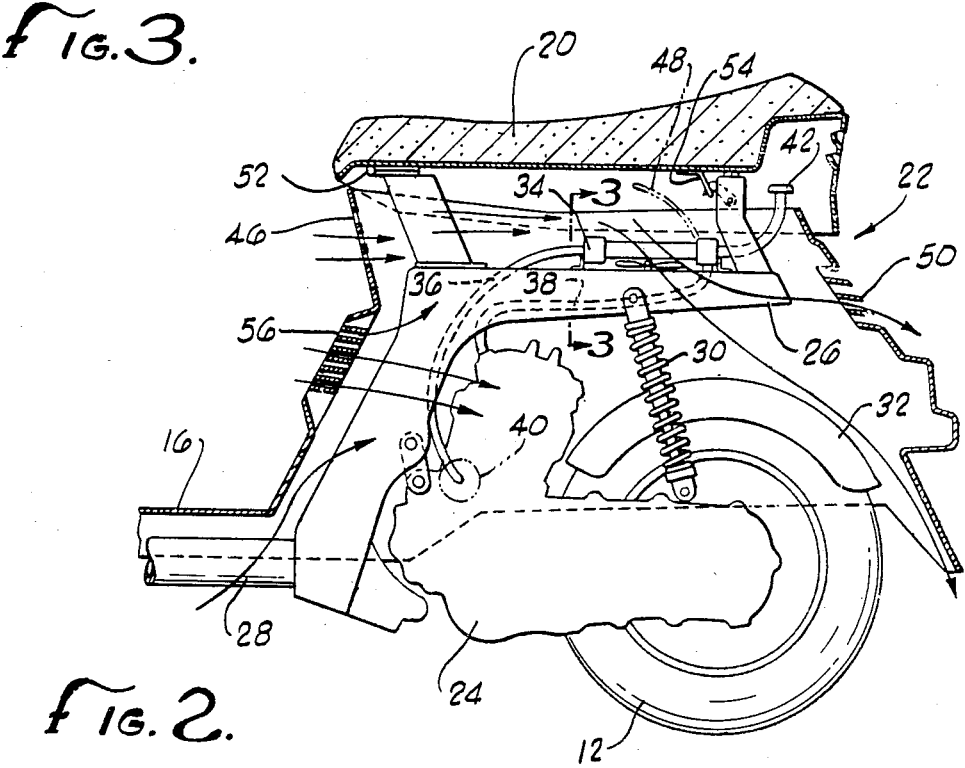
FIG. 2 is a cross-sectional elevation of the rear body portion of the motorcycle of FIG. 1.

Turning in detail to the drawings, FIGS. 1-3 illustrate a first embodiment of a motorcycle of the motor scooter type having front and rear wheels 10 and 12, a front leg shield 14, a step floor 16, a front steering and handle grip assembly 18 and a seat 20. A rear body 22 supports the seat 20, partially covers the rear wheel 12 and encloses an engine and drive train assembly 24. Looking specifically to FIG. 2, contained within the rear body 22 is the engine and drive train assembly 24 in the lower portion of the engine compartment formed within the rear body 22. A rear frame 26 extends upwardly from a rearwardly extending down tube 28 and rearwardly to structurally support the seat 20 and provide a mounting for a cushion assembly 30. A rear fender 32 protects the interior of the rear body 22 from dirt, water and the like directed into the engine compartment by the rear wheel 12.

A water cooling system of the type employing water or another liquid coolant is positioned within the rear body 22 and includes a radiator 34. Tubes 36 and 38 connect the radiator 34 with the engine 24. A water pump 40 induces flow through the cooling system. The radiator 34 further includes a filler cap 42 for maintenance of the cooling system.

The radiator 34 is illustrated as being positioned substantially horizontally within the rear body 22. This arrangement provides for a lower profile of the vehicle. However, where additional vertical height is available, the radiator may be more vertically arranged to allow the air passing through the radiator to follow a less circuitous path. The tubes 36 and 38 extending between the radiator 34 and the engine 24 may be conveniently arranged in fixed position relative to the rear frame 26 as can best be seen in FIG. 3. A fan 44 is conveniently mounted within the rear frame 26, again as best illustrated in FIG. 3, adjacent the radiator 34 to draw cooling air therethrough. The fan 44 may be thermostatically controlled so as to be activated only when the cooling system reaches a certain, preselected temperature.

Air flow directed to the cooling system extends through a passage defined principally by the interior of the rear body 22. Inlet openings 46 in the front of the rear body 22 allow cooling air forced by forward motion of the vehicle to pass inwardly in the upper portion of the rear body 22. This cooling air, as indicated by the arrows in FIG. 2, then passes rearwardly to the location of the radiator 34. The air then passes through the radiator 34 and is exhausted toward the rear of the rear body 22. A baffle 48 is arranged to urge the incoming air from the openings 46 to pass through the radiator 34. Depending on the specific arrangement, the baffle 48 may be more or less extensive as needed.

At the rear of the rear body 22 is a louvered outlet opening 50 for exhausting of air from the engine compartment generally and from the radiator 34 more specifically. Air may also be evacuated from the engine compartment in the rear body 22 from the underside of the vehicle as is illustrated by the arrows. Separate engine compartment inlet openings 56 direct air to the engine 24 as indicated by the arrows in FIG. 2.

To provide easy access for maintenance of the cooling system, the seat 20 is pivotally mounted about a hinge 52 such that it can be swung upwardly. A latch mechanism 54 conventionally operates to hold the seat 20 in place. With the seat 20 in its upward position, the filler cap 42 is exposed for easy access.

Figure 4:
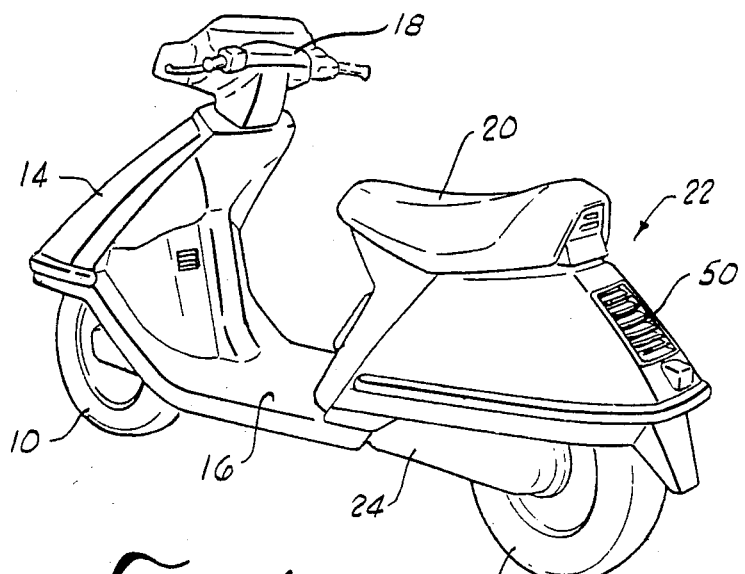
FIG. 4 is an oblique view of another motorcycle employing the present invention.
Figure 5:
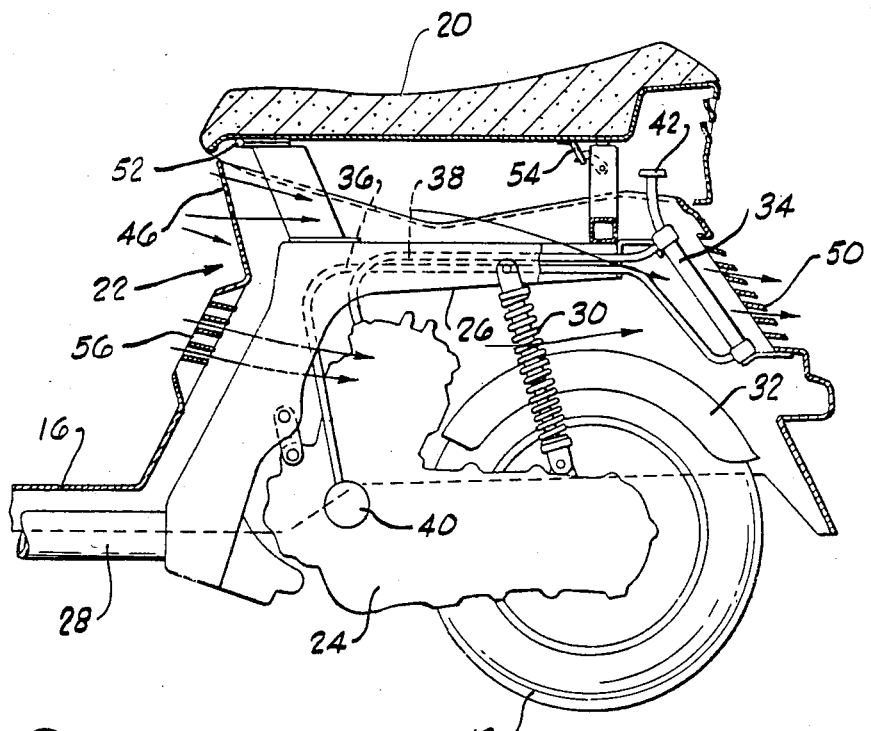
FIG. 5 is a cross-sectional elevation of the rear body of the motorcycle of FIG. 4.

Turning next to the embodiments illustrated in FIGS. 4 and 5, a motorcycle of the type employing the present invention is also illustrated. Reference numerals employed in describing the embodiment of FIGS. 1-3 are here employed to reflect equivalent elements.

In the embodiment of FIGS. 4 and 5, the radiator 34 is located at the back of the rear body 22 immediately adjacent the outlet opening 50. In this location, the natural lower pressure experienced at the back of a vehicle when the vehicle is moving forwardly is employed to draw air through the rear body 22, the radiator 34 and the outlet opening 50. An inlet opening 46 allows air to be directed inwardly to the rear body as indicated by the arrows in FIG. 5. Air may be simultaneously directed toward the engine 24 through louvered engine air inlet openings 56 which may also be directed through the radiator 34 or downwardly and out the bottom of the rear body 22. By placing the radiator 34 in the position as best seen in FIG. 5, the heated air exhausting from the radiator 34 will not be directed to the engine 24.

Thus, motorcycles are illustrated of the type having front leg shields, step floors and a rear body which are advantageously water cooled by appropriately positioned radiators for maximum efficiency and compactness. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A motorcycle having a rear body containing a rear mounted engine, comprising
   a radiator mounted in the rear body above the rear mounted engine;
   inlet openings in the front of the rear body; and
   a passage above the engine in the rear body from said inlet openings to said radiator.

2. The motorcycle of claim 1 further comprising a fan adjacent said radiator.

3. The motorcycle of claim 1 wherein said radiator is substantially horizontally mounted.

4. The motorcycle of claim 1 further comprising outlet openings at the back of the rear body to vent air from the rear body.

5. A motorcycle having a rear body containing a rear mounted engine, comprising
   a radiator mounted at the back of the rear body behind the engine;
   exhaust openings in the back of the rear body immediately adjacent said radiator; and
   inlet openings in the upper front of the rear body above the engine for air to enter.

6. The motorcycle of claim 5 further comprising inlet openings in the rear body in front of said engine for air to enter.

7. A motorcycle having a rear body containing a rear mounted engine, comprising:
   a radiator mounted in the rear body above the rear mounted engine,
   inlet openings in the front of the rear body;
   a passage above the engine in the rear body from said inlet openings to said radiator; and
   engine compartment inlet openings spaced downwardly from said inlet openings to direct air to the engine.

8. A motorcycle having a rear body containing a rear mounted engine, comprising
   a radiator mounted in the rear body above the rear mounted engine;
   inlet openings in the front of the rear body;
   a passage above the engine in the rear body from said inlet openings to said radiator; and
   a seat above the rear body, said seat being hinged to allow access to said radiator.

9. A motorcycle having a rear body containing a rear mounted engine, comprising:
   a radiator mounted at the back of the rear body behind the engine;
   exhaust openings in the back of the rear body immediately adjacent said radiator; and
   a seat above the rear body, said seat being hinged to allow access to said radiator.

* * * * *